US006463301B1

(12) United States Patent
Bevan et al.

(10) Patent No.: US 6,463,301 B1
(45) Date of Patent: Oct. 8, 2002

(54) BASE STATIONS FOR USE IN CELLULAR COMMUNICATIONS SYSTEMS

(75) Inventors: David Damian Nicholas Bevan; Kevin Malcolm Kelly, both of Herts (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 08/971,830

(22) Filed: Nov. 17, 1997

(51) Int. Cl.[7] .......................... H04B 1/38; H04M 1/00

(52) U.S. Cl. ...................... 455/562; 342/368; 342/371; 342/372

(58) Field of Search ............................ 455/561, 562, 455/436, 440, 450; 342/372, 370, 329, 330, 334

(56) References Cited

U.S. PATENT DOCUMENTS 4,931,803 A * 6/1990 Shimko .................... 342/371
5,303,240 A * 4/1994 Borras et al. ............. 370/347
5,493,306 A * 2/1996 Rudish et al. ............ 342/371
5,563,609 A * 10/1996 Smith ...................... 342/372
5,701,583 A * 12/1997 Harbin et al. .............. 455/25
5,872,547 A * 2/1999 Martek .................... 348/815
5,890,067 A * 3/1999 Chang et al. ............. 455/446
5,907,816 A * 5/1999 Newman et al. .......... 455/562
5,914,946 A * 6/1999 Avidor et al. ............. 370/336
5,973,641 A * 10/1999 Smith et al. .............. 342/372

FOREIGN PATENT DOCUMENTS

WO WO 96/23328 * 8/1996

* cited by examiner

*Primary Examiner*—Daniel Hunter
*Assistant Examiner*—Temica M. Davis
(74) *Attorney, Agent, or Firm*—Lee, Mann, Smith, McWilliams Sweeney & Ohlson

(57) ABSTRACT

A base station of a cellular communications system forms a plurality of adjacent overlapping beams in azimuth across a coverage area, and the position of the plurality of beams is varied in unison about a rest position whereby to provide a mean antenna gain in all azimuthal directions across the coverage area and to minimise cusping loss. The position of the beams can be varied by a movement in azimuth over one half, or multiples of one half, of the angular separation of the formed beams. Preferably there are a plurality of base stations in the system, each of whose plurality of beams are varied in position independently of the other base stations. The beams can be varied at a rate which is substantially equal to the rate of variation of one of the effects normally experienced by a terminal, and which the system operator incorporates a margin to accommodate.

20 Claims, 8 Drawing Sheets

BASE STATIONS FOR USE IN CELLULAR COMMUNICATIONS SYSTEMS

FIELD OF THE INVENTION

This invention relates to base stations for use in cellular communications systems.

BACKGROUND OF THE INVENTION

Cellular communications systems are currently in use providing radio telecommunications to mobile users. Such systems divide a geographic area into cells, each cell being served by a base station through which subscriber stations communicate. Cells are often divided into sectors with each sector being served by an antenna arrangement mounted at the base station. Sectored systems can provide increased capacity and reduced interference compared with non-sectored systems. FIG. 1 shows a typical array of cells 10, each cell being divided into three sectors 11, 12, 13 and served by a base station 14.

To meet increasing demand for mobile communications services there is interest in further improving the capacity of systems.

One known technique for improving the capacity or coverage on the uplink path of a cell site is to form fixed receive beams at the base station such that each cell sector is covered by a number of beams rather than just a single beam. By narrowing an antenna's beam pattern in azimuth, the antenna gives increased gain in the boresight direction. For example, increasing the number of beams in a 120° sector from 1 to N (N=4 is a suitable example), allows one to design beams giving approx. 10 $\log_{10}(N)$ dB of gain in their boresight direction. This narrowing of the beam pattern also improves spatial filtering by rejecting interference caused by other users within the same sector (but not in the beam direction) and from users in neighbouring cells.

The combination of increased gain and reduced interference level allows for a greater path loss figure in the power budget for the uplink, and hence a greater cell range. Alternatively, for a given cell radius it is possible to increase capacity. In a typical mobile Code Division Multiple Access (CDMA) system, forming extra beams on the uplink is effectively equivalent to increasing the sectorisation factor. As an example, providing four beams per uplink sector in a tri-sectored cell gives equivalent performance gains to using cells which are divided into twelve sectors.

The simplest way to form these beams is by using separate antennas, one for each beam. Each beam is constructed as a separate antenna, such as a flat plate antenna construction with printed elements and appropriate phasing connections to provide the required directivity and hence gain. Base station antennas are normally constructed with a narrow gain pattern in elevation. This would require a tall antenna of the order of 10 to 20 wavelengths in height. Forming beams with individual passive antennas is attractive because it allows the gain pattern to be tailored to requirements. However, a beam pattern which is narrow in azimuth also requires a wide antenna aperture of several wavelengths in width. This may lead to antennas which are excessively heavy and which have a high wind loading.

An alternative technique for generating N beams with full sector coverage is to generate orthogonal beam outputs from the same aperture. The beams are orthogonal in the sense that there is zero mutual coupling between beam ports, and the average value of the cross-product of the radiation pattern of one beam with the conjugate of any other beam is zero. As an example, four beams can be generated from four radiating elements, and it is only required to support a single such antenna for each sector because the set of beams use a single common antenna aperture. A common technique for doing this beamforming is to pass antenna element outputs through passive phase shifters to create beamformed outputs in the frequency band on which the signals are received (i.e. 'at RF'). One such implementation is known as the 'Butler Matrix'. In order to ensure the full gain (approx. 10 $\log_{10}(N)$ dB) at the beam peaks, phase shifters with zero attenuation (a so-called 'uniform aperture distribution') are used. This gives a number of beams with approximately a 'sinx/x' gain profile.

FIG. 2 shows a typical coverage pattern for this type of antenna structure.

Four individual beams 101, 102, 103, 104 area shown by dashed lines. The maximum gain (approx. 10 $\log_{10}(N)$) occurs at the beam peaks 110. The problem is that the gain of neighbouring beams has dropped by 4dB at the beam crossovers 115. These beam crossovers are halfway in angle to the first null. This is because for orthogonal beams the boresight of one beam corresponds to the null of another. These crossover points are often referred to as 'cusps'.

Cusps cause problems when attempting to provide an even cellular coverage over a certain geographical area. Mapping the locus of the cell edge, i.e. the locus of points with, on average, equal quality of service, gives the sort of 'flower petal' arrangement shown in FIG. 2. This diagram represents a single 120° sector of a tri-sectored cell site, with 4 orthogonal beams in the sector. The cusp depth 130 in terms of power in this example is 4 dB. The geographical distance this represents i.e. the difference in cell radius between beam peak and beam cusp depends on the propagation law which in turn depends on such factors as carrier frequency and antenna heights. For a typical propagation law of 35 dB increase in path loss per decade of range increase, and for a typical cell radius (at the beam peak) of 5 km, this represents a reduction in radius at the beam cusps of around 1.2 km, giving a cell radius of 3.84 km at the cusps.

It is not simple to tessellate such cells to allow the beam peaks from one cell to coincide with the cusps from another. If the cells are tessellated as if they were circular with a 5 km radius, then there will be areas of poor availability, where the received signal quality is likely to be poor. An alternative is to treat the cells as being circular with the lesser 3.84 km radius at the cusps. This improves availability but makes inefficient use of base stations, requiring almost 70% more base stations than for 5 km radius cells to cover a given geographical area. Operators may be tempted to tessellate bases with a cell radius somewhere between 3.84 km and 5 km, but this would lead to some areas on the cell edge of above-average availability, and other areas with below-average availability.

One solution to the cusping problem is described in European Patent Application EP 0 647 978 A2. An output of a transceiver is split into two signals which are fed to two adjacent beams. This application also describes how ripple in the inter-facet region of the radiation pattern of a muti-faceted antenna can be minimised by varying the relative phase of the facets.

The present invention seeks to minimise the effects of cusping in cellular radio systems.

SUMMARY OF THE INVENTION

A first aspect of the present invention provides a method of operating a base station of a cellular communications system comprising:

forming a plurality of adjacent beams in azimuth across a coverage area, and varying the position of the plurality of beams in unison whereby to provide a mean antenna gain in all azimuthal directions across the coverage area.

Varying the position of the beams has the effect of varying the position of the cusped regions of the beam pattern thereby reducing the effects of cusping loss across the coverage area. The position of the beams can be varied by a movement in azimuth over one half, or multiples of one half, of the angular separation of the formed beams.

Preferably there are a plurality of base stations in the system, each of whose plurality of beams are varied in position independently of the other base stations. Independently steering the beam pattern of each base station has the advantage that there is minimal correlation between the gain profile of signals received by a subscriber from adjacent base stations, or in signals received by adjacent base stations from a particular subscriber. This further minimises the effects of cusping loss.

The position of the plurality of beams can be varied by mechanically moving the antenna array. Alternatively, and more preferably, the position of the plurality of beams can be varied by electrically steering the beams by applying a phase shift to elements in the antenna array. The phase shift can take the form of a phase-shift gradient which is applied across the elements of the antenna array.

Preferably the beams are varied at a rate which is substantially equal to the rate of variation of one of the effects normally experienced by a terminal, and which the system operator incorporates a margin to accommodate.

In planning a system, a system operator uses a signal link budget to guarantee a particular quality of service to a subscriber. The link budget includes positive gain factors such as transmit power and antenna gain and negative factors such as propagation loss and margins to cope with effects such as shadowing and fading that a mobile will experience. Shadowing is typically experienced by a mobile terminal due to terrain and obstacles in the signal path between the base station and mobile.

By varying the position of the beam pattern formed by the base station, the mean antenna gain in all directions is increased, with the antenna gain at a particular point varying between a minimum gain (at the cusp) and a maximum gain (at a beam peak) as the beam pattern is moved. The link budget therefore gains several dBs due to the increased mean antenna gain, but some margin needs to be allowed in the link budget to guarantee a particular quality of service in the presence of the moving beam pattern.

A signal between a mobile and a base station will vary according to the sum of a first varying component due to movement of the beam pattern, and other varying components due to the propagation effects of shadowing. If the variation in signal level due to the beam movement is similar to the effect of shadowing then the sum, in the dB domain, of these varying components results in a received signal which has a marginally greater degree of variance compared to each effect taken alone. The overall margin which must be used in the link budget to accommodate for the effects of the beam movement and shadowing, and to guarantee a particular quality of service, is greater than the margin that the operator would have allowed for shadowing alone. However, the difference between this new overall margin and the original margin that the operator would have allowed for shadowing is less than the improvement in the link budget that is achieved by having the mean gain profile equal in all directions, therefore resulting in a net gain in the link budget. This has the advantages of allowing a larger cell for a given transmit power.

The rate at which the position of the beams is varied can be made substantially equal to the rate at which shadowing varies for a typical mobile terminal. This can be taken as the rate at which a typical mobile moves between extremes of shadowing, which is typically of the order of 5–100 s, corresponding to a required rate of beam movement of 0.01–0.2 Hz.

The position of the beams can be varied at a linear rate or pseudorandomly, with the pseudorandom variation having a time constant substantially equal to the rate at which a typical mobile terminal moves between extremes of shadowing.

In a further embodiment, the position of the beams is varied at a faster rate, which is of a similar order to the rate at which fast-fading occurs, typically 1–100 Hz. There is an upper limit to the rate at which the beam position can be varied which is due to the design constraints of a mobile terminal receiver. Mobile receivers are designed to cope with a limited rate of variation in amplitude and phase of an incoming signal.

The variation in the position of the plurality of beams can be applied to beams providing a downlink path to a terminal, to beams providing an uplink path from a terminal or to both of these.

The method is particularly suitable for a base station which operates according to a code division multiple access (CDMA) protocol.

Another aspect of the present invention provides a cellular communications base station comprising:

an antenna array which forms a plurality of adjacent beams in azimuth across a coverage area; and a control device for varying the position of the plurality of beams in unison whereby to provide a mean antenna gain in all azimuthal directions across the coverage area.

A further aspect of the present invention provides a cellular communications system comprising at least one base station as above.

Preferred features may be combined as appropriate, and may be combined with any of the aspects of the invention, as would be apparent to a person skilled in the art.

BRIEF DESCRIPTION OF THE DRAWINGS

For a better understanding of the invention, and to show by way of example how it may be carried into effect, embodiments will now be described with reference to the accompanying drawings, in which.

DESCRIPTION OF PREFERRED EMBODIMENT

Figure 1:
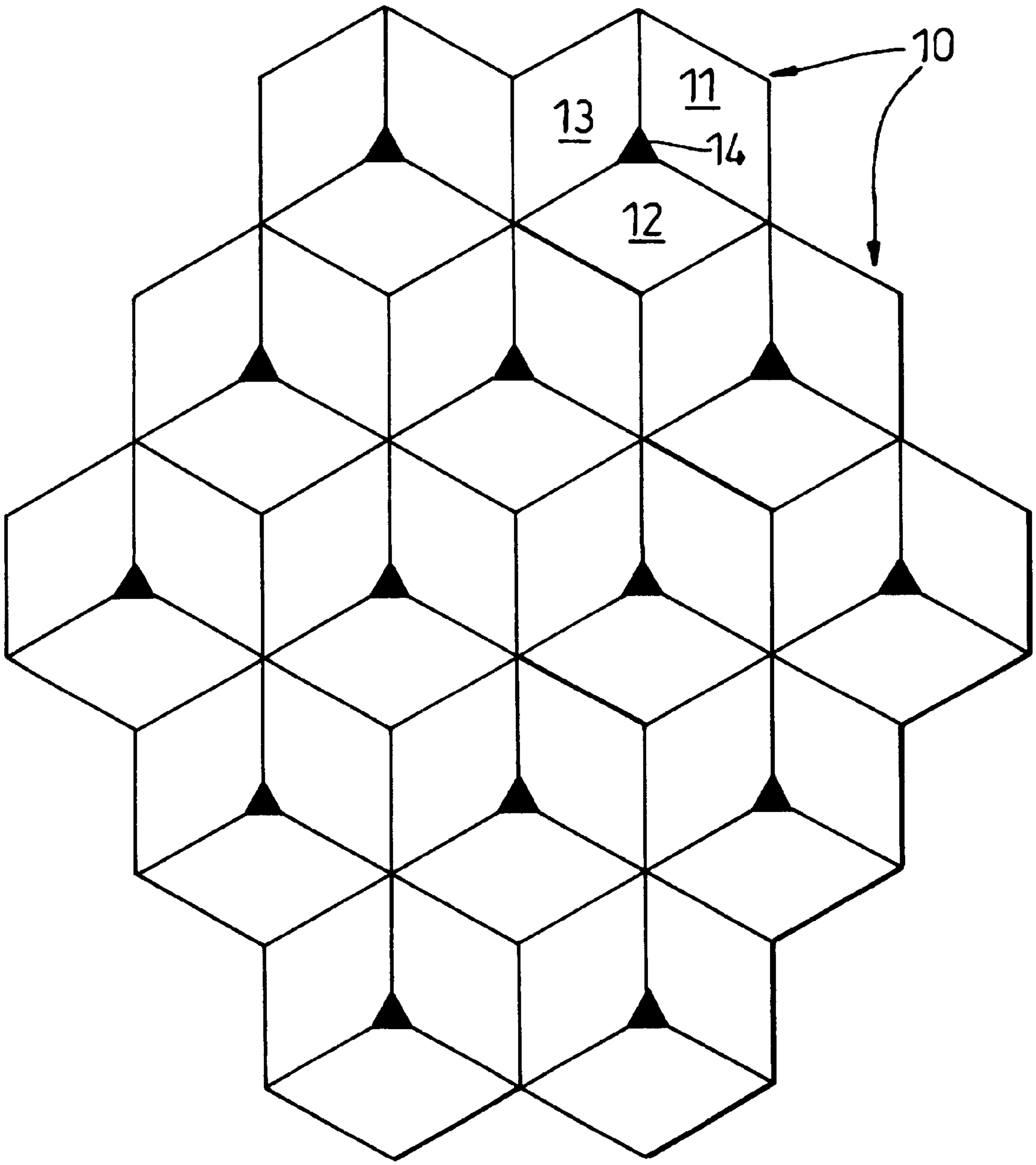
Fig. 1 (PRIOR ART)
FIG. 1 shows a typical layout for a sectored cellular communications system.
Figure 2:
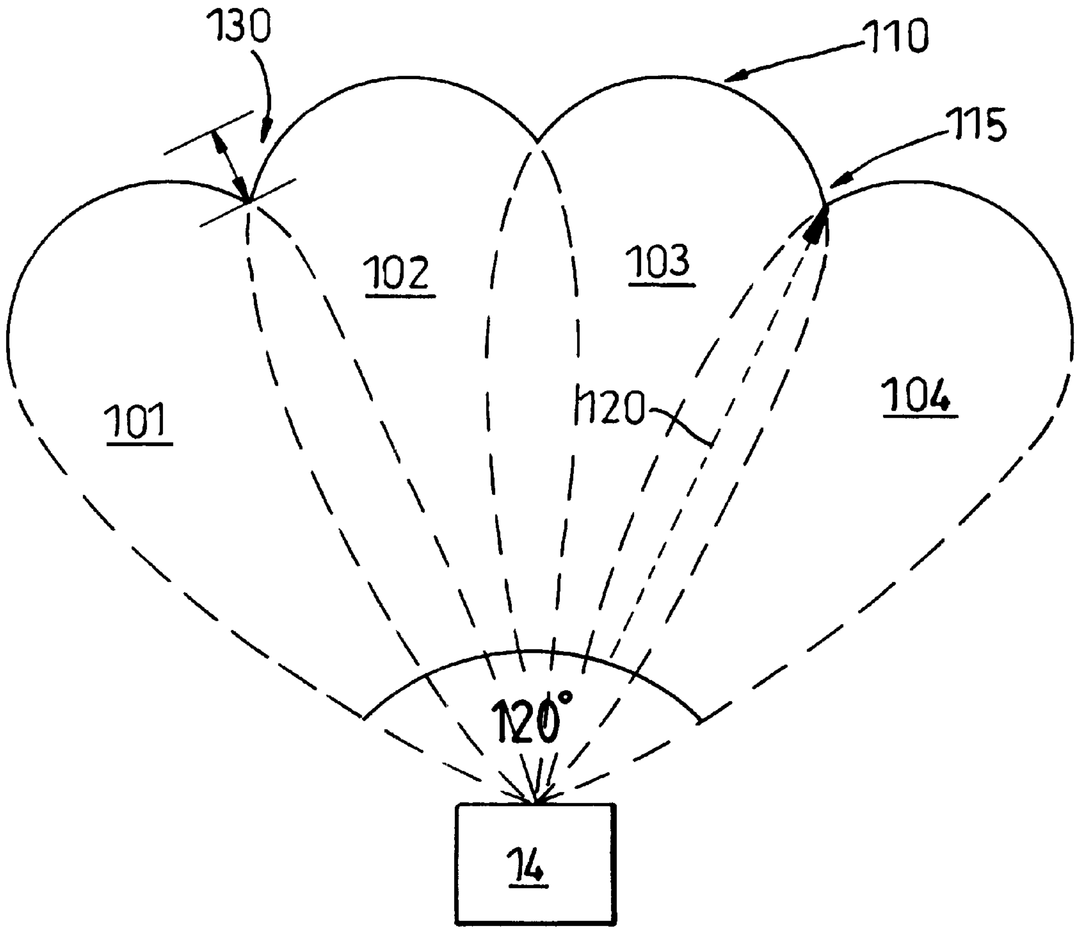
Fig. 2 (PRIOR ART)
FIG. 2 shows a typical coverage pattern for a sector of the cellular communications system shown in FIG. 1, the pattern being formed by a plurality of beams in a known manner.
Figure 3:
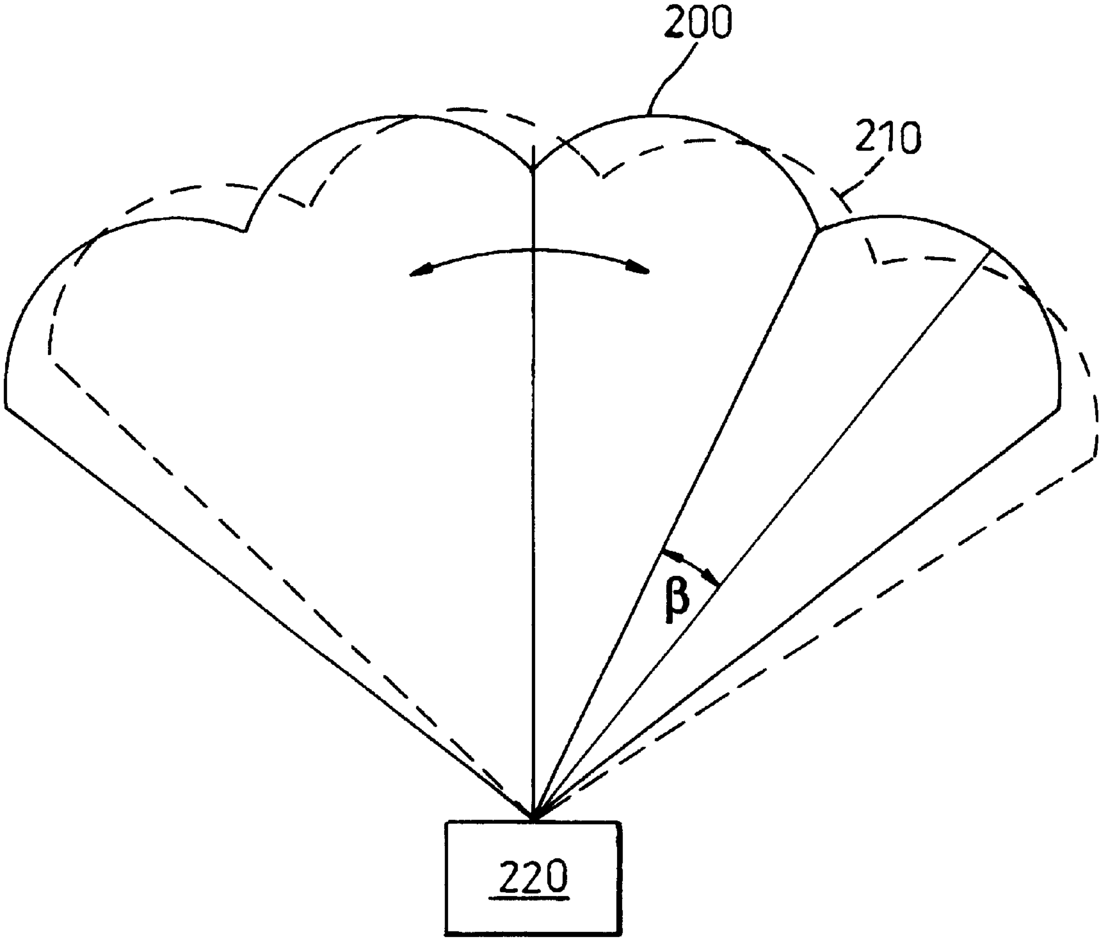
FIG. 3 shows a similar pattern to that of FIG. 2 in which position of the beams is varied.

FIG. 3 shows a coverage pattern for a 120° sector of a cellular communications system. An antenna array at base site 220 forms four beams, as shown previously in FIG. 2. Area 200 defined by the solid line represents a rest position of the composite beam pattern. As noted above, this composite beam gain pattern suffers from the problem of cusping. Each beam supports a communications path for communications signals between the base station and a communications terminal. The communications signals support a telephone or data call between the terminal and another subscriber who is part of the cellular network or the PSTN. Each beam can support a communications path with a particular terminal which is independent of the adjacent beam. The communications signals may multiplexed according to code, frequency or time division multiple access protocols, or to combinations of these.

The beam orientations are varied or steered, in unison, by a movement in azimuth about this rest position. The position of the beams can be varied by a side-to-side movement in azimuth over one half, or multiples of one half, of the angular separation of the formed beams. The angle representing one half of the angular beam separation is shown as $\beta$ in FIG. 3. The position of the beams can be varied from the rest position to a maximum extent of one half of the angular beam separation one side of the rest position and back again to the rest position or by a movement of one half of the angular beam separation each side of the rest position. Both of these movements result in a mean antenna gain which is equal in all directions. Dashed area 210 represents the coverage pattern at some intermediate position between rest position 200 and the maximum extent of steering. A 120° four beam sector is shown here only as an example. The size of the sector and the number of beams which serve the sector are not limited to the values shown here; for example, steering could be applied to a 60° sector which is served by eight beams.

Figure 4:
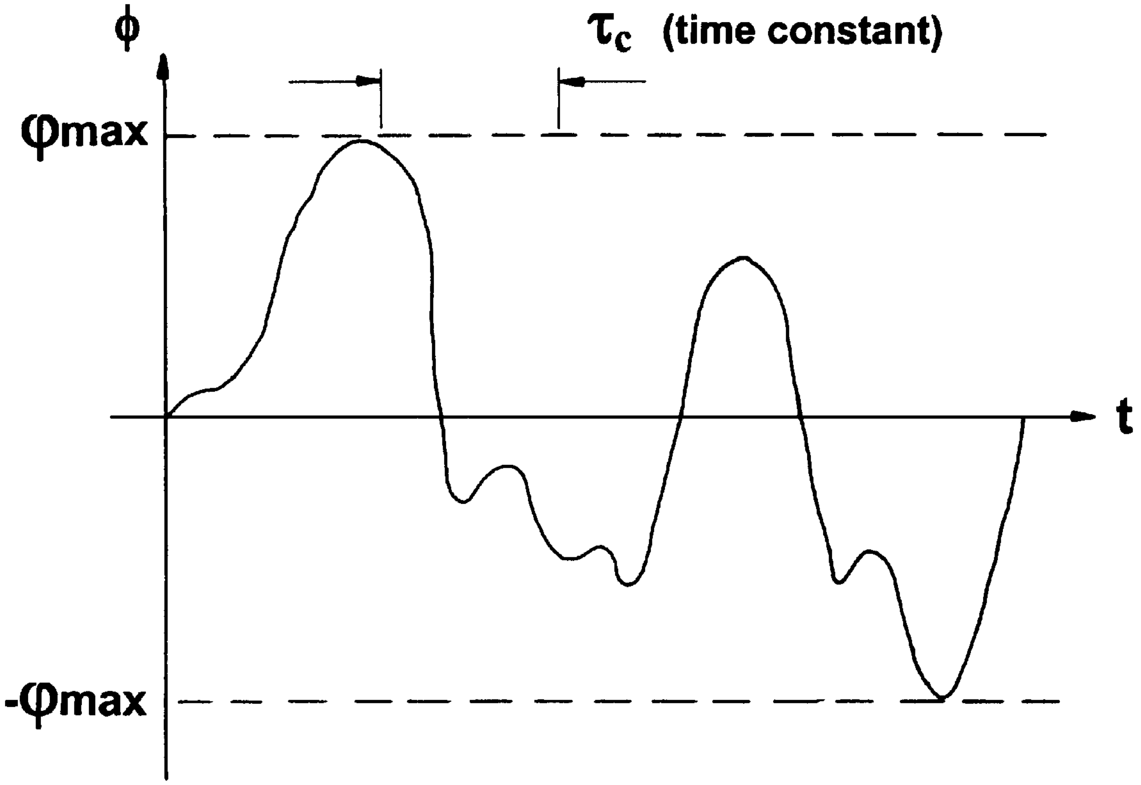
FIG. 4 shows one example of a signal for controlling movement of the beams.

The steering of the beam pattern is conveniently controlled by a steering signal, which represents 'steering angle versus time.'The signal may take a number of formats. One format is a pseudorandom steering signal with a uniform probability distribution over all angles. FIG. 4 shows an example pseudorandom signal of steer angle versus time. The values $\phi_{max}$, $-\phi_{max}$ represent maximum values of the steering signal which cause the beam pattern to be steered through an angle of half the angular beam separation. If the beam pattern is steered over just one half of the angular beam separation then one of the values $\phi_{max}$, $-\phi_{max}$ will equal zero as it will be the rest position of the beam pattern. The pseudorandom signal preferably has a time constant $\tau_c$ commensurate with the variation in interference and lognormal shadowing experienced by a typical subscriber in the system. Taking the example of a mobile subscriber who moves from a position of deepest shadow to minimum shadow in a time of the order of 10 seconds then this should also typically be the time that it would take the steering signal to move between its extrema. Subscribers in a system will of course be moving at different speeds—some will be stationary, some will be walking and some will be travelling in vehicles—and the time taken to move between extremes of shadowing will vary accordingly. The time constant chosen for the beam steering will not ideally match the change in shadowing experienced by all subscribers, but by choosing a time constant corresponding to a typical subscriber, an advantageous effect can be achieved for most subscribers. The time constant $\tau_c$ of the steering signal is proportional to $1/f_c$, where fcis the cut-off frequency of the steering signal. Thus the time constant $\tau_c$ determines the rate that the steering signal changes the position of the beams. One model for shadow fading is described by M. Gudmundson in Electronics Letters Vol.27 No.23, Nov. 7, 1991.

A second format for the steering signal is a linear, sawtooth-like variation of steering angle versus time. As above, the time taken for the steering signal to move between its extrema can be chosen to correspond to the time that a typical subscriber takes to move between the maximum and minimum extents of shadowing.

The steering can be achieved in a number of ways. One technique is to mechanically rotate the antenna array that forms the beams. An electrically powered motor may be used to impart rotation to the antenna array.

Figure 5:
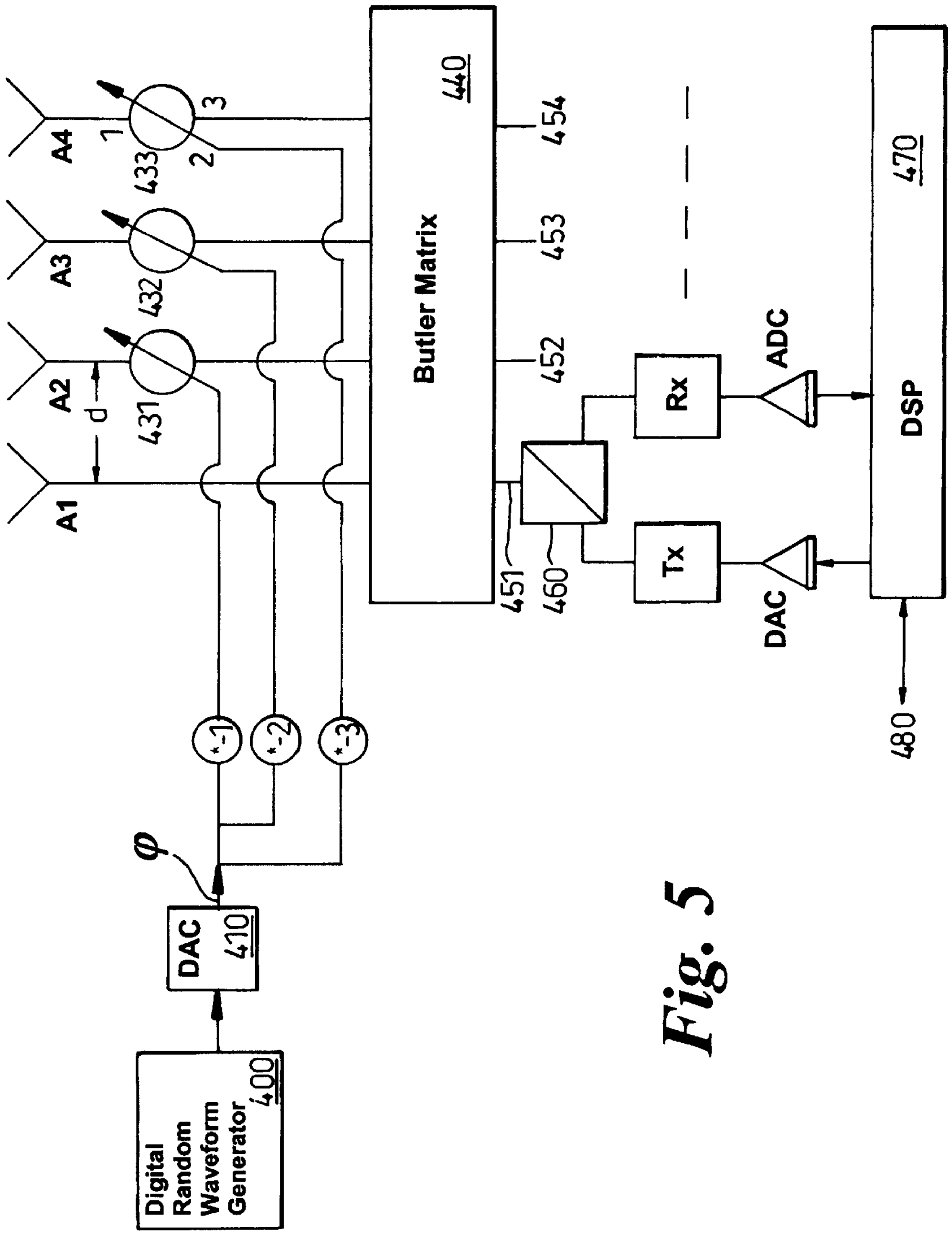
FIG. 5 is a block diagram of a system to implement the effect shown in FIG. 3.

Alternatively, and more preferably, the antenna array remains mechanically fixed, and steering is applied to signals by additional phasing networks at RF or baseband, depending on where beamforming is implemented. FIG. 5 shows an example of a system which implements beam steering at RF. The diagram is described with reference to receiving signals from a subscriber, i.e. operating on the uplink path, but can similarly be used for the downlink path. Antenna elements A1, A2, A3, A4 of an antenna array are coupled to a beam- forming Butler matrix 440. Phase shifting devices 431, 432, 433 are placed in the paths between antenna elements A2, A3, A4 and matrix 440.

In operation, RF signals are received by the antenna elements and phase-shifted by phase shifting devices 431, 432, 433. A digital random waveform generator 400 generates a digital waveform which is converted to an analogue voltage by digital-to-analogue converter DAC 410. The digital signal has a resolution of e.g. 8 or 16 bits and has a sample rate which is much greater than the time constant $\tau_c$. This is the signal $\phi$ shown in FIG. 4. The analogue voltage generated by DAC 410 is applied to phase shifters 431, 432, 433 via respective multiplier devices. Steering the generated set of beams in unison requires a progressive phase shift to be applied to the elements of the array. The multipliers scale the signal generated by DAC 410 to achieve this steering effect.

Each of the phase-shifting devices operates in a manner which will be described with reference to the ports numbered on device 433. A voltage applied at baseband to port 2 of the device causes a $\phi$ degree phase shift at RF between ports 1 and 3. Butler matrix 440 delivers a set of steered beam outputs 451, 452, 453, 454. Each output 451, 452, 453, 454 from the matrix is a signal received by one of the beams generated by the antenna array. Signals received by each of the antenna elements A1–A4 are appropriately phase-shifted and summed in a known manner by the matrix 440 to derive each of the matrix outputs. It can be seen that a common antenna aperture—the array of elements A1–A4—is used to form the plurality of beams. Processing for one matrix output 451 is shown. Outputs 452, 453 and 454 have similar processing equipment. Matrix feed 451 is fed to a diplexer which feeds a transmitter TX and a receiver RX which perform conversion between RF and baseband. A digital-to-analog converter DAC and an analog-to-digital converter ADC couple to the TX and RX and deliver digital signals to/from baseband digital signal processor DSP 470. The DSP processes the set of received signals, each representing the output from one of the beams generated by the antenna array to form a combined signal for outputting 480 for further processing.

Figure 6:
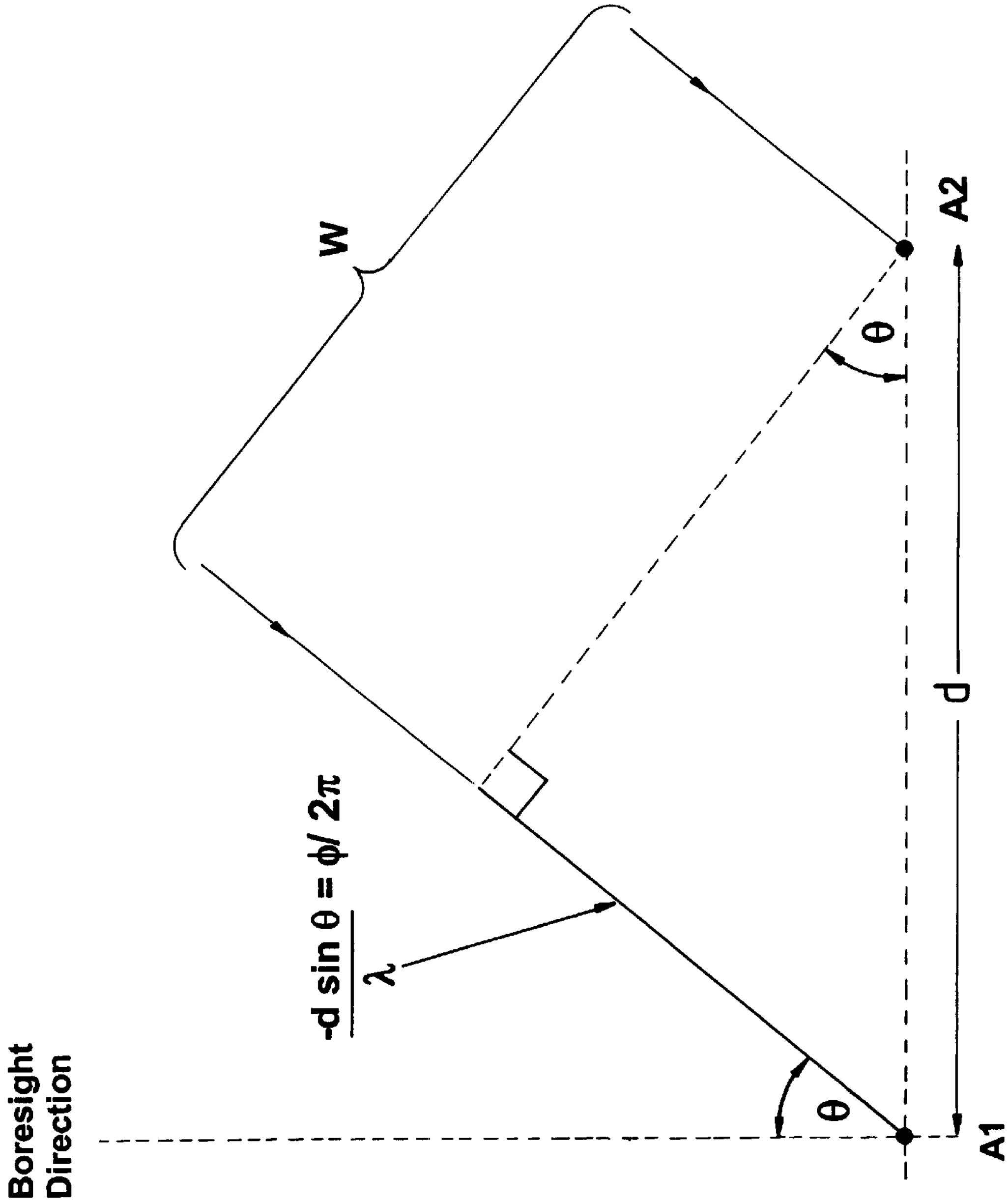
FIG. 6 illustrates the operation of the antenna array in FIG. 5.

FIG. 6 illustrates the effect of phase-shifting, for antenna elements A1, A2 and an incoming wave W from a distant source, such as a mobile. In FIG. 6 the symbols represent:

θ=angle off a 'boresight' beam;

d =element spacing, usually of the order of λ/2;

λ=wavelength of RF carrier (e.g. 16 cm at 1.875 GHz);

ϕ=differential phase shift per element.

θ represents the difference in path length experienced by wave W between arriving at elements A1 and A2. For the wave to arrive in-phase at these two elements a phase-lag of ϕ must be applied to element A2. Similarly, an element A3 located a distance d to the right of element A2 needs to have a phase-lag of 0 with respect to A2, or 2ϕ with respect to element A1. This phase gradient across the antenna elements determines the direction of the beam peak, and varying the magnitude and direction of the gradient causes the beam peak and the beam pattern as a whole, to move.

Figure 7:
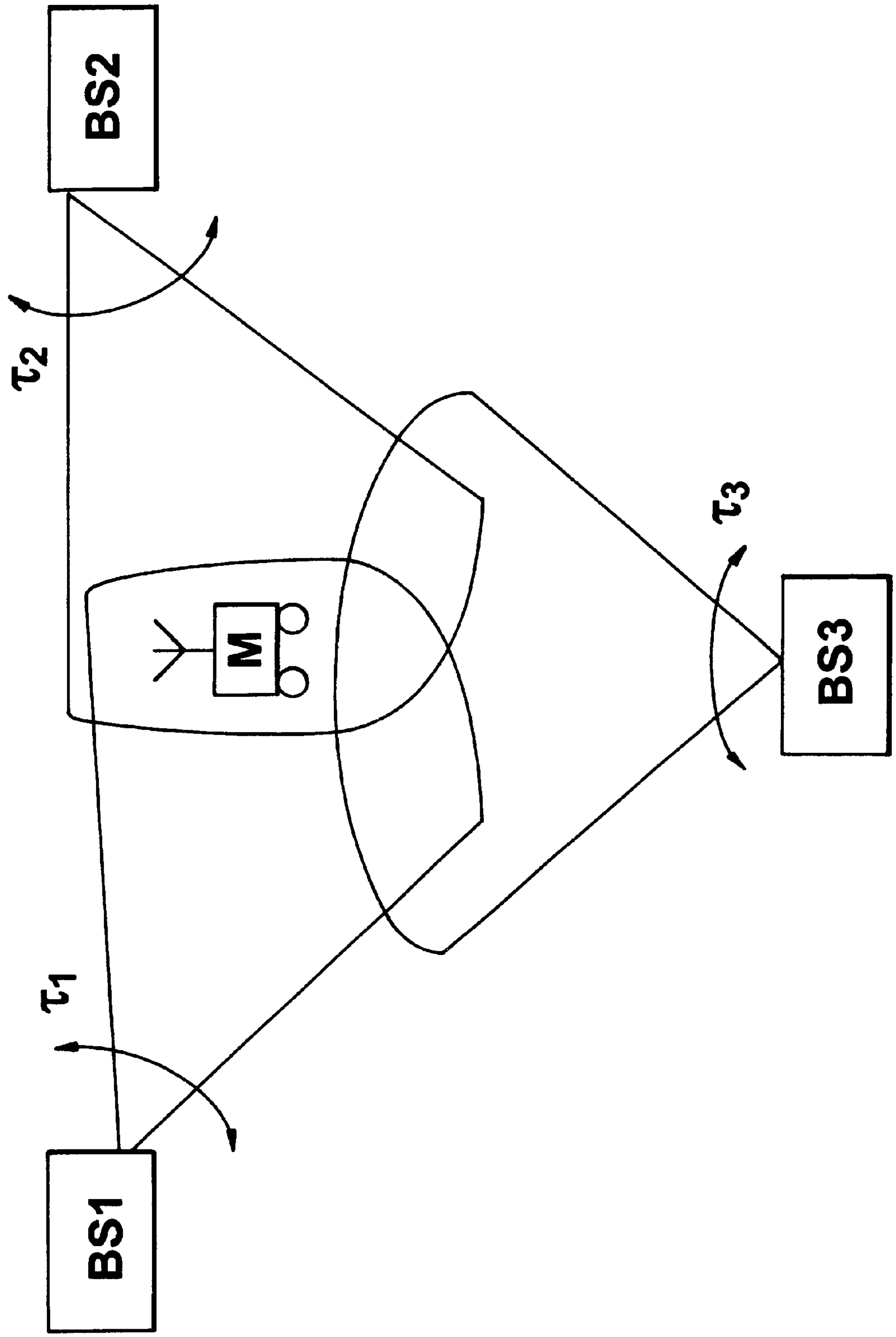
FIG. 7 shows a cellular communications system with a plurality of base sites of the type shown in FIGS. 3 to 6.
Figure 8A:
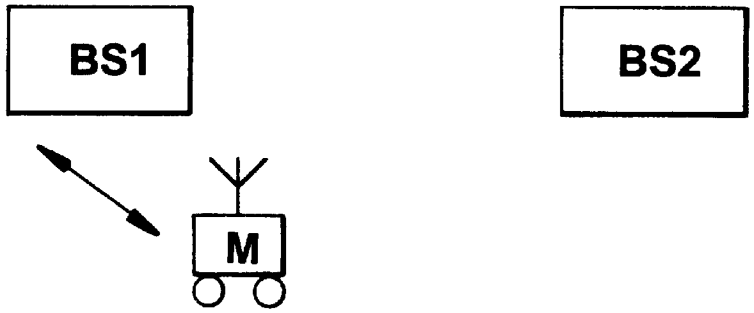
FIGS. 8A to 8C show soft-handoff in a CDMA system.
Figure 8B:
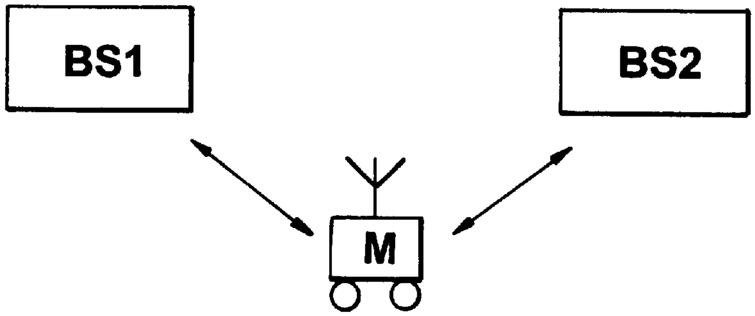
Figure 8C:
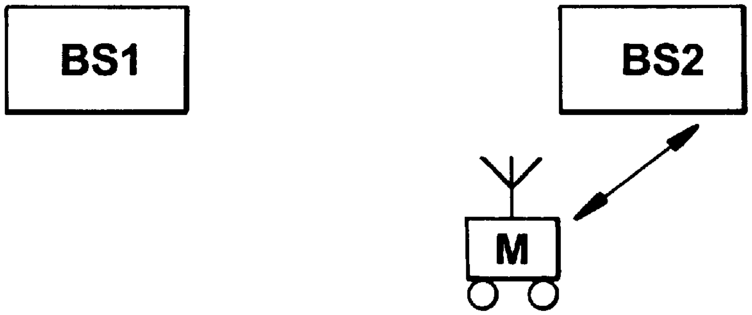

FIG. 7 shows a cellular communications system with three base stations BS1, BS2, BS3. A CDMA radio communications system allows multiple base stations to simultaneously receive signals from a mobile during a process known as 'soft handoff'. 'Soft handoff' will now be briefly described with reference to FIGS. 8A to 8C. In FIG. 8A mobile M is served by base station BS1. In FIG. 8B mobile M has moved within range of both base stations BS1 and BS2 and is served by both of them. Finally, in FIG. 8C, the mobile has moved nearer to BS2 and is served solely by BS2. From the above, it can be seen that in the uplink direction transmissions from a mobile M will simultaneously be received at BS1 and BS2, and in the downlink path mobile M will simultaneously receive signals from BS1 and BS2. The uplink beams of each base station BS1, BS2, BS3 in FIG. 7 are steered in the manner just described, and the three base stations are steered independently of one another i.e. the steering of one base station's beams is not the same as the steering of a neighbouring base station's beams. This maximises the performance gain during the soft handoff period, as it is likely that the beam steering at at least one base station will have an advantageous effect. The base stations BS1, BS2, BS3 are steered by steering signals which have the respective time constants $\tau_1$, $\tau_2$, $\tau_3$. The time constants $\tau_1$, $\tau_2$, $\tau_3$ can be equal but the steering signals of each base station should be different from one another in the time domain.

Steering the beams results in a mean antenna gain which is now equal in all directions. The gain profile for a beam pattern which is formed by a Butler Matrix is given by:

$$y(\theta) = \left[ \frac{\sin\left[N\left(\frac{d}{\lambda}\cdot\pi\cdot\sin(\theta)\right)\right]}{\sqrt{N}\cdot\sin\left(\frac{d}{\lambda}\cdot\pi\cdot\sin(\theta)\right)} \right]$$

Where:

y(θ) is amplitude gain at angle θ off boresight

N is number of elements d is the inter-element spacing

λ is wavelength

Averaging the dB value of the gain profile over ± half beam separation gives the mean antenna gain.

In a typical example (for N=4, d/λ=0.5) a mean gain of 4.74 dB (as opposed to only 2 dB at the beam cusp) is achieved. Thus it looks as if 2.74 dB has been gained in the link budget (compared with the worst-case cusp situation), and performance is spread evenly in all directions. The former is not quite true, however, because we will also have to increase the margin somewhat to still guarantee 10% coverage on the cell perimeter. The mean gain is improved, but with the addition of some variability. Like the variability of shadowing, we have to introduce a margin. However the mobile at the cell edge in a two-way CDMA soft-handoff is seeing two independently steered beams from the two neighbouring bases. The probability at any one time of sitting in the cusps of both beam patterns is low. We can also combine the variability of the beam gain in with the shadowing to derive a margin which is less than the sum of the margins for each effect considered in isolation.

The variability of beam gain can be modelled as lognormal with a standard deviation of around 1 dB, and independently varying at neighbouring bases (the steer signal is independently pseudorandomly generated with a different seed value). The variation in beam gain can then be combined with the lognormal shadowing to give a new lognormal random variable (with the variance in the dB domain being the sum of the individual variances) with a new correlation value between neighbouring bases. This is then substituted into a numerical computation considered along with the variability in interference to give a single margin for the link budget. The increase in this margin will be lower than the 2.74 dB that is gained in the example above, thereby resulting in a net gain.

The improvements which can be gained will now be illustrated mathematically.

Let us model shadowing as a function having a lognormal distribution with a standard deviation σ of 6 dB.

So, expressing shadowing in dB terms, $$10\log_{10}(x)$$

we say that it has a normal distribution with a s.d. =6.

We assume that our margin for 90% availability is y standard deviations from the mean, where y is our 'shadow margin.'

We also model beam dither as a function having a lognormal distribution, with e.g. a standard deviation of 1 dB.

The effects of shadowing and beam dither results in a function which has a variance (s.d.$^2$)=sum of variances of the above functions.

$$\text{So } \sigma_{sum}{}^2 = 6^2 + 1^2 = 37$$

$$\sigma_{sum} = \sqrt{37}$$

It can be seen that the variance has only marginally increased.

The new margin, which guarantees 90% availability, in the presence of shadowing and a dithered beam pattern is:

$$\sqrt{37}/6 \times \text{original margin for shadowing alone}$$

i.e. the margin that must be allowed to guarantee a particular availability in the presence of shadowing and a dithered beam pattern is only slightly increased over the margin that must be allowed for shadowing.

But by dithering the beam pattern to give a higher mean antenna gain in all directions we have gained several dBs in the overall link budget. Therefore there is a net gain in the link budget.

Where several base stations independently dither their beam patterns there are further gains in the link budget.

What is claimed is:

1. A method of operating a base station of a cellular communications system comprising:

forming a plurality of adjacent beams in azimuth across a coverage area, and varying the position of the plurality of beams in a dither fashion in unison whereby to provide a mean antenna gain in all azimuthal directions across the coverage area.

2. A method according to claim 1 wherein there are a plurality of such base stations in the system, the position of the plurality of beams at the base station being varied substantially independently from the beams of other base stations in the system.

3. A method according to claim 1 wherein an angle between a bore sight of two adjacent beams determines an angular beam separation, and wherein the position of the beams is varied in azimuth by one half, or an integer multiple of one half of the angular beam separation.

4. A method according to claim 3 wherein the position of the beams is varied in azimuth to one side of a rest position.

5. A method according to claim 3 wherein the position of the beams is varied in azimuth each side of a rest position.

6. A method according to claim 1 wherein the beams are varied at a rate which is substantially equal to the rate of variation of loss effects normally experienced by a terminal in the system, and which a system operator incorporates a margin to accommodate.

7. A method according to claim 6 wherein the rate at which the position of the beams is varied is substantially equal to the rate of variation in shadowing experienced by a typical mobile terminal.

8. A method according to claim 7 wherein the rate at which the position of the beams is varied is in the range 0.01–0.2 Hz.

9. A method according to claim 6 wherein the rate at which the position of the beams is varied is substantially equal to the rate of variation in fast-fading experienced by a typical mobile terminal.

10. A method according to claim 1 wherein the position of the beams is varied at a linear rate.

11. A method according to claim 1 wherein the position of the beams is varied pseudorandomly.

12. A method according to claim 1 wherein the beams are formed at an antenna array and wherein the step of varying the position of the plurality of beams comprises mechanically moving the antenna array.

13. A method according to claim 1 wherein the beams are formed at an antenna array and wherein the step of varying the position of the plurality of beams comprises electrically steering the beams by applying a phase shift to elements in the antenna array.

14. A method according to claim 13 wherein the steering comprises applying a phase-shift gradient across the elements in the antenna array.

15. A method according to claim 1 wherein there is at least one terminal served by the base station and wherein the variation in the position of the plurality of beams is applied to beams providing a downlink path to the terminal.

16. A method according to claim 1 wherein there is at least one terminal served by the base station and wherein the variation in the position of the plurality of beams is applied to beams providing an uplink path from the terminal.

17. A method according to claim 1 wherein the base station operates according to a code division multiple access (CDMA) protocol.

18. A cellular communications base station comprising:

an antenna array which forms a plurality of adjacent beams in azimuth across a coverage area; and a control device for varying the position of the plurality of beams in a dither fashion in unison whereby to provide a mean antenna gain in all azimuthal directions across the coverage area.

19. A cellular communications system comprising at least one base station according to claim 18.

20. A method of operating a base station of a cellular communications system comprising:

forming a plurality of adjacent beams in azimuth across a coverage area, each beam being capable of supporting a communications path between the base station and a communications terminal the plurality of beams having a cusped gain pattern, and varying the position of the plurality of beams in a dither fashion in unison whereby to provide a mean antenna gain in all azimuthal directions across the coverage area.

* * * * *